(12) United States Patent
Rambo

(10) Patent No.: US 9,641,804 B2
(45) Date of Patent: *May 2, 2017

(54) AUDIO/VIDEO CONFERENCING SYSTEM

(71) Applicant: Avago Technologies General IP (Singapore) Pte. Ltd., Singapore (SG)

(72) Inventor: Darwin Rambo, Salmon Arm (CA)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/012,416

(22) Filed: Feb. 1, 2016

(65) Prior Publication Data

US 2016/0227171 A1    Aug. 4, 2016

Related U.S. Application Data

(63) Continuation of application No. 14/188,888, filed on Feb. 25, 2014, now Pat. No. 9,250,777, which is a continuation of application No. 10/620,048, filed on Jul. 15, 2003, now abandoned.

(51) Int. Cl.
   | | |
   |---|---|
   | *G06F 15/16* | (2006.01) |
   | *H04N 7/15* | (2006.01) |
   | *G06F 3/0484* | (2013.01) |
   | *G06F 3/0486* | (2013.01) |

(52) U.S. Cl.
   CPC ......... *H04N 7/155* (2013.01); *G06F 3/0486* (2013.01); *G06F 3/04842* (2013.01); *H04N 7/15* (2013.01)

(58) Field of Classification Search
   CPC ..................................................... H04N 7/155
   See application file for complete search history.

(56) References Cited

U.S. PATENT DOCUMENTS

| | | | |
|---|---|---|---|
| 5,195,086 A | 3/1993 | Baumgartner et al. | |
| 5,754,765 A | 5/1998 | Danneels et al. | |
| 5,758,079 A | 5/1998 | Ludwig et al. | |
| 5,764,743 A | 6/1998 | Goedken et al. | |
| 5,999,208 A | 12/1999 | McNerney et al. | |
| 5,999,525 A | 12/1999 | Krishnaswamy et al. | |
| 6,192,118 B1 | 2/2001 | Bayless et al. | |
| 6,289,382 B1 | 9/2001 | Bowman-Amuah | |
| 6,339,754 B1 | 1/2002 | Flanagan et al. | |
| 6,400,996 B1 * | 6/2002 | Hoffberg ............ | G05B 19/0426 370/218 |
| 6,559,863 B1 | 5/2003 | Megiddo | |
| 6,584,076 B1 | 6/2003 | Aravamudan et al. | |

(Continued)

OTHER PUBLICATIONS

Non-Final Office Action for U.S. Appl. No. 14/188,888 mailed Apr. 9, 2015.

(Continued)

*Primary Examiner* — Gerald Smarth
(74) *Attorney, Agent, or Firm* — Foley & Lardner LLP

(57) ABSTRACT

Aspects of the present invention may be found in a system and method to effectively schedule and configure video and audio conferences. In one embodiment, the system comprises a server and one or more audio/video conferencing devices interconnected through a public or private data network. In one embodiment, a graphical user interface (GUI) provides for an intuitive means to graphically view and configure one or more conferences, participants, and conference call configuration settings.

20 Claims, 4 Drawing Sheets

(56) References Cited

U.S. PATENT DOCUMENTS

| | | |
|---|---|---|
| 6,754,181 B1 | 6/2004 | Elliott et al. |
| 6,807,563 B1 | 10/2004 | Christofferson et al. |
| 6,816,468 B1 | 11/2004 | Cruickshank |
| 7,856,473 B2 | 12/2010 | Horikiri |
| 2001/0055308 A1 | 12/2001 | Afrakhteh et al. |
| 2002/0054205 A1 | 5/2002 | Magnuski |
| 2002/0076025 A1 | 6/2002 | Liversidge et al. |
| 2003/0025786 A1 | 2/2003 | Norsworthy |
| 2003/0026407 A1 | 2/2003 | Ernstrom et al. |
| 2003/0110220 A1 | 6/2003 | Lapstun et al. |
| 2003/0140084 A1 | 7/2003 | D'Angelo |
| 2003/0174826 A1* | 9/2003 | Hesse ............... H04L 12/1818 379/210.01 |
| 2004/0170265 A1 | 9/2004 | Benco et al. |
| 2007/0186002 A1 | 8/2007 | Campbell et al. |

OTHER PUBLICATIONS

Notice of Allowance for U.S. Appl. No. 14/188,888 mailed Sep. 29, 2015.

Non-Final Office Action for U.S. Appl. No. 10/620,048 mailed May 31, 2007.

Final Office Action for U.S. Appl. No. 10/620,048 mailed Nov. 27, 2007.

Non-Final Office Action for U.S. Appl. No. 10/620,048 mailed Aug. 6, 2008.

Final Office Action for U.S. Appl. No. 10/620,048 mailed Feb. 4, 2009.

Non-Final Office Action for U.S. Appl. No. 10/620,048 mailed Mar. 29, 2013.

Final Office Action for U.S. Appl. No. 10/620,048 mailed Sep. 30, 2013.

\* cited by examiner

Graphical User Interface

| Audio | Video | View | Tools | Share | Call | ..... | Help |
|---|---|---|---|---|---|---|---|
| Conference #1 | | Conference #2 | | Conference #3 (Locked) | | | Conference #N |

Participant #1

Participant #6     Participant #3

Participant #2     Participant #7     Participant #5

Participant #4

Figure 4

AUDIO/VIDEO CONFERENCING SYSTEM

RELATED APPLICATIONS

This application is a continuation of and claims priority to and the benefit of U.S. patent application Ser. No. 14/188,888, filed Feb. 25, 2014, which is a continuation of and claims priority to and the benefit of U.S. patent application Ser. No. 10/620,048, filed Jul. 15, 2003. The entire contents of the foregoing are hereby incorporated herein by reference for all purposes.

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Audio and video conferencing provides a significant resource to those who reside in distant locations. Critical information may be exchanged in an effective manner without the inconvenience of traveling to meet with other parties. Although it has become a significant tool, audio and video conferencing has a number of limitations related to its use.

One disadvantage related to audio/video conferencing relates to effectively utilizing a vast number of different features available to configure a conference call. Typical features provided by conferencing systems include the ability to create side conferences, conduct roll calls, mute one or more participating members, and provide pre-recorded broadcast messages to one or more participants. Often, remembering the vast number of different features poses a problem for many users. Because of the number of features, a reference card is provided to a user for use during a conference call. These cards, however, are often printed in small type and are very difficult to interpret and use.

Another issue in configuring one or more features of conference calls relates to implementation. Often, implementing a particular feature requires keying in a string or a sequence of DTMF (dual tone multi-frequency) tones. The sequences may be long and remembering a sequence may be a very difficult process. Further, remembering more than a few of these sequences may be a very arduous task.

A significant disadvantage to current conferencing systems involves the difficulty and complexity of invoking various feature sets while participating in a conference call. A participant may have to enter one or more states or modes in his conferencing device prior to entering the appropriate DTMF sequence that allows him to configure his conferencing device with the desired feature. The process is not intuitive and a participant may run into significant problems during a conference call. Often times, a call may be dropped or a conference call may be terminated if the wrong DTMF sequence is input. This often causes unwanted frustration to users who become more hesitant to use such features in the future.

Finally, DTMF tones often result in irritating audible distractions during a conference call. This often occurs when a participant enters or exits a conference call while a conversation is occurring during the conference call or when a user wishes to invoke a particular feature, in addition to annoying a participant, the wrong sequence of DTMF tones may terminate a conference call.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method to effectively schedule and configure video and audio conference calls. Aspects of the present invention allow one to intuitively view and configure call setup configurations of one or more conference calls by way of a graphical user interface (GUI).

In one embodiment, the system comprises a computing device that is communicatively coupled with a server, capable of displaying information regarding a status of a conference call based on at least one communication received from the server. In one embodiment, the computing device comprises a display used for displaying a graphical user interface. In one embodiment, the graphical user interface provides one or more lists of participants grouped by way of one or more conference calls. In one embodiment, a user of the graphical user interface easily makes one or more selections by way of using a point, click, and drag device.

In one embodiment, the method comprises configuring side conference calls by selecting one or more participant identifiers from at least one conference call, and positioning the selected participant identifiers into a side conference call identifier. In one embodiment, the positioning is accomplished by pointing, clicking, and dragging the selected participant identifier. The participant identifier is dragged to the side conference identifier.

In one embodiment, the method comprises configuring one or more conference calls by creating conference identifiers and grouping participant identifiers into the conference identifiers. In one embodiment, the conference identifiers comprise software objects. In one embodiment, the software objects may incorporate a conference call name, icon, logo, or insignia. In one embodiment, the selection of a participant identifier effectuates receipt of a corresponding video feed. The corresponding video feed may be displayed using a new window. In one embodiment, the method comprises locking one or more conference calls to prevent participation by additional participants. The grouping of participant identifiers may provide a roll call of participants participating in the one or more conference calls. In one embodiment, an audio feed is translated at a server prior to transmission to a participant. The server s used to enhance the quality of pre-recorded audio or video prior to broadcasting to one or more participants. In one embodiment, the video feed comprises a recorded playback of the one or more conference calls and in another embodiment, the recorded playback comprises an image enhanced playback.

These and other advantages, aspects, and novel features of the present invention, as well as details of illustrated embodiments, thereof, will be more fully understood from the following description and drawings.

BRIEF DESCRIPTION OF THE DRAWINGS

FIG. 4 illustrates a block diagram of a graphical user interface in accordance with an embodiment of the invention.

DETAILED DESCRIPTION OF THE INVENTION

Aspects of the present invention may be found in a system and method to effectively schedule and configure an audio/video conferencing system. The audio/video conferencing system comprises a network such as an exemplary server communicating to a number of computing devices. Each of the computing devices is configured to provide a graphical user interface. In one embodiment, a graphical user interface (GUI) provides for a more intuitive means to graphically view one or more conferences, participants, and current settings. The GUI may provide one or more exemplary "workspaces" in which a user may view, interact, and configure the audio/video conferencing system. In an exemplary Microsoft operating system, the term "workspaces" may be alternatively termed "windows". Although aspects of the invention may describe a windows environment that utilizes the Microsoft Windows Operating System, it is contemplated that the invention may be applied alternatively to other operating systems that use workspaces to view, interact, and configure the audio/video conferencing system.

Figure 1:
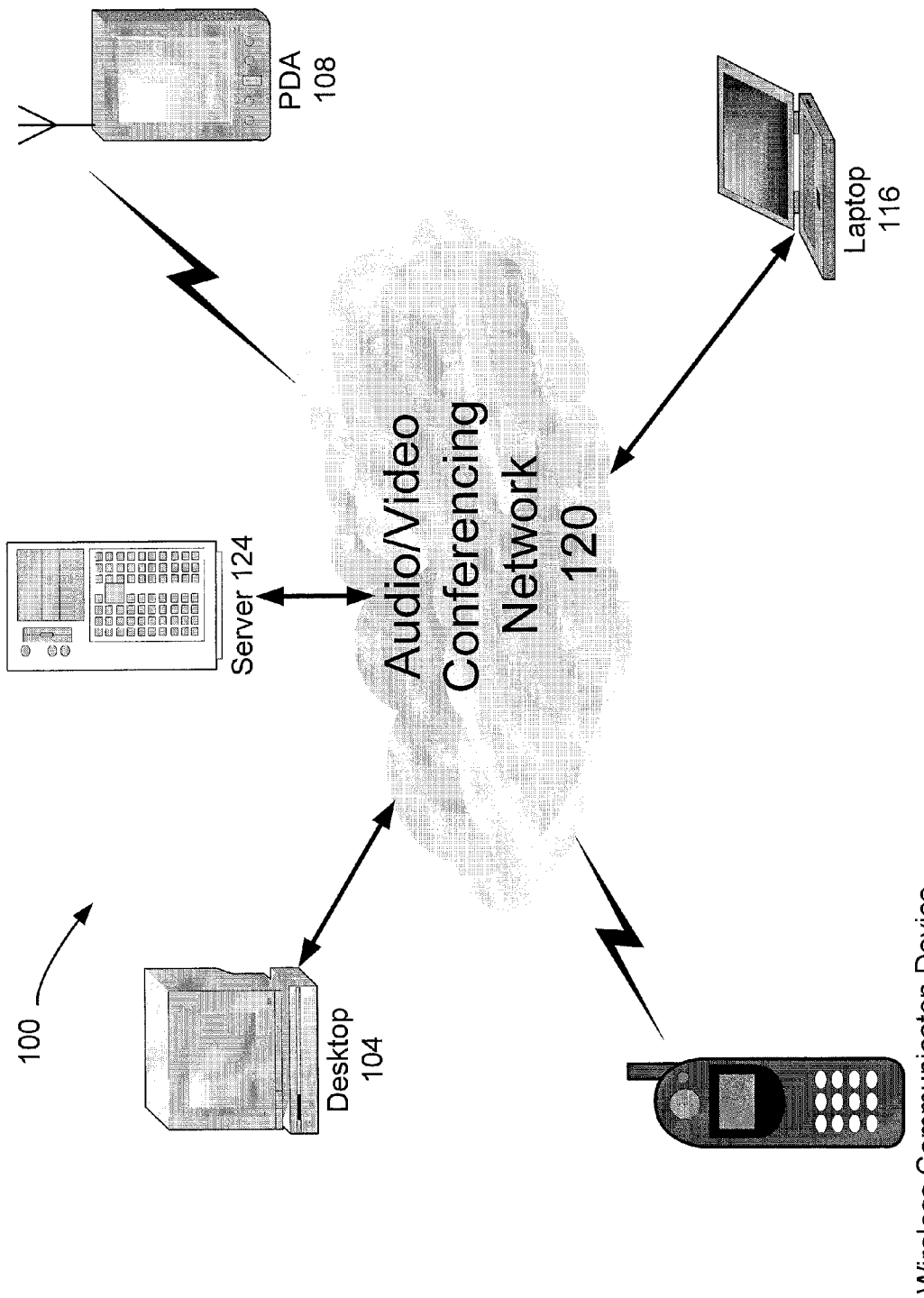
FIG. 1 is a block diagram of an audio/video conferencing system in accordance with an embodiment of the invention

FIG. 1 is a block diagram of an audio/video conferencing system 100 in accordance with an example embodiment of the invention. As illustrated, an audio/video conferencing network 120 interconnects one or more computing devices. The computing devices may comprise an exemplary desktop 104, a personal digital assistant (PDA) 108, a wireless communication device 112, a laptop 116, a server 124, or other like device (e.g., an IP phone). The audio/video conferencing network 120 may comprise one or more public and/or private data networks interconnected together. For example, the public network may comprise an Internet network while the private network may comprise a dedicated private line. It is contemplated that any data communications network capable of connecting two or more computing devices is acceptable. It should be noted that the audio/video conferencing system 100 illustrated is but one example embodiment and other embodiments, which do not depart from the scope of the invention, may be enabled.

The server 124 comprises any type of computer system or device capable of storing and providing data to one or more computing devices over the audio/video conferencing network 120. The server 124 is capable of receiving and storing call setup configuration information from the one or more computing devices. The server 124 acts to coordinate, configure, and facilitate transmission of audio and/or video conference calls. The server 124 may run an appropriate software capable of communicating, receiving, displaying, appropriately configuring, scheduling, and broadcasting one or more conference calls. The server 124 may comprise a storage device capable of storing a database used in configuring conference calls. It is contemplated that the server 124 may use one or more secure protocols to communicate to the one or more computing devices. The secure protocols may employ encryption algorithms such as secret key encryption and/or a public key encryption algorithms to securely transmit and decrypt the contents of any transmitted audio, video, or call setup configuration information. It is contemplated that security standards such as AES, DES, Triple DES, and the like may be used to securely transmit data within the audio and/or video conference call system.

The audio/video conferencing call system 100 may be capable of providing a number of features that are facilitated by the server 124. The server 124 may facilitate a request by a participant to arrange a private side conference for two or more participants. In response, the server 124 may securely acknowledge such a side conference request by way of an encrypted message using one or more secure encryption algorithms. A side conference may be securely transmitted to those participants who have been authorized to view the side conference. It is contemplated that the participant may be authenticated by way of one or more user name and passwords prior to being accepted into a conference call. In one embodiment, fingerprints or facial profiling may be used to identify a participant. It is contemplated that one or more suitable computer input devices are used to facilitate a fingerprint or facial profiling recognition system. In addition, the server 124 may facilitate a request by a participant to mute himself while a conference call is underway, to lock or bar other parties from attending a conference that has begun, to mute all participants during a pre-recorded broadcast of a conference call, and to mute or reduce the volume of another party during a conference call. It should be noted that these are a few example embodiments of requests made by a participant causing a configuration change in the conference call setup environment. It is contemplated that a graphical user interface may be additionally enabled for a host's or administrator's use. By logging in as a host or administrator, by way of an authorized user name and password, it is contemplated that the graphical user interface (GUI) may be enabled to allow administrative control of the exemplary requests previously mentioned. It is contemplated that a user may log in as a host or administrator using the server 124 or any one of the other computing devices 104, 108, 112, 116 illustrated in FIG. 1. It is presumed there are additional call setup embodiments that do not depart from the scope of the invention that may be enabled by way of the audio/video conferencing call system 100.

The server 124 may facilitate scheduling a conference call by way of inputs provided by an authorized host. The host may be authorized to schedule conference calls by inputting an exemplary user name and password. The host may disseminate conference call information to one or more selected participants by way of a secure messaging system such as e-mail or wireless messaging such as SMS. It is contemplated that such conference call information may include date and time of the conference call, as well as password information to access the conference call. During a conference call, the server 124 may automatically adjust the broadcast volume level to accommodate for the number of participant inputs. In one embodiment, a previously recorded audio or video conference may be enhanced in quality prior to re-transmission over a pre-recorded broadcast. For example, signal to noise ratio enhancement techniques may be used for audio transmissions while video pixel averaging enhancement techniques may be used for video transmissions. In one embodiment, an audio conference is translated to one or more languages at the server prior to transmission to the one or more participants. It is contemplated that a software based translation utility resident in memory, at the server, may be used to translate a pre-recorded or live audio conference into one or more languages prior to transmission to one or more requesting participants. It is also contemplated that a translation delay may occur during transmission of live audio conferences.

Figure 2:
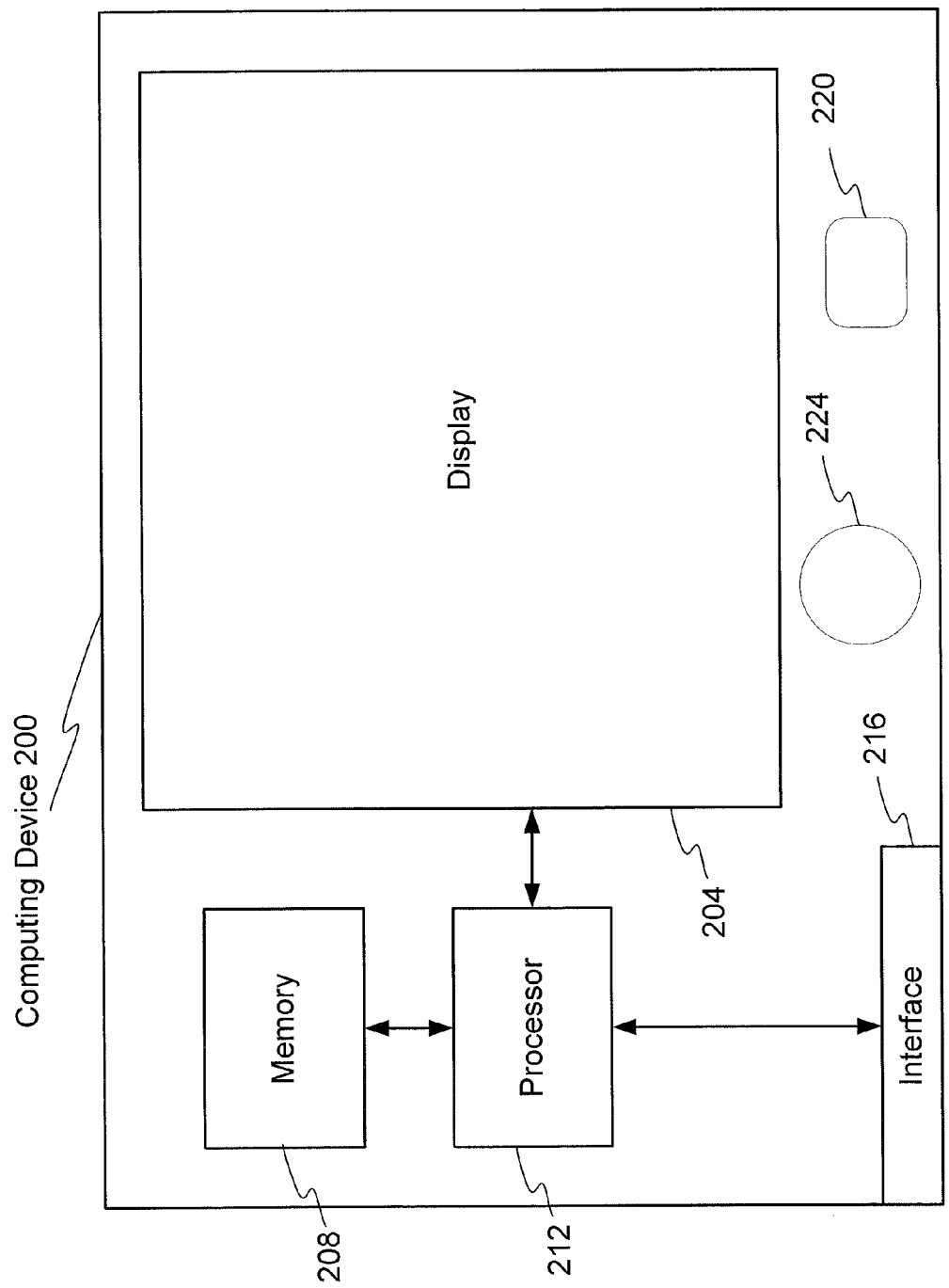
FIG. 2 illustrates a block diagram of an audio and/or video conferencing device in accordance with an embodiment of the invention.

FIG. 2 illustrates a block diagram of a computing device 200 in accordance with an embodiment of the invention. The computing device 200 comprises, for example, an exemplary laptop, desktop computer, PDA, wireless communication device, or the like (e.g., an IP phone). The computing device comprises a display 204, memory 208, a processor 212, an interface 216, an audio input device 220, and a video input device 224. The display is used to provide a graphical user interface for viewing one or more audio/video conferencing windows or workspaces. One or more windows may display call setup parameters, participant lists, current conference call configuration information, or provide real time streaming video of one or more participants. One or more graphical or visual indicators displayed on one or more windows may specify a participant's status in the audio/video conference call. The graphical user interface generated at the computing device 200 may be implemented by way of software downloaded from a server. The server may act as a repository of various software required for communication and display at the computing device 200. The software downloaded to the computing device 200 may be opened and compiled by the processor 212 operating with the memory 208. The memory 208 may comprise non-volatile, volatile, and mass storage memory. The resulting compiled software application may be stored in the memory 208 for use by the computing device 200 when needed. The graphical user interface may incorporate a pull down menu with one or more tabs, allowing a user to view one or more options that may be selectable by an exemplary mouse. The graphical user interface comprises software objects such as radio buttons and input fields allowing a participant to easily configure a conference call. It is contemplated that the input fields may comprise a location in a window where a participant may input a user name and password. It is further contemplated that the input fields comprise a location in which an exemplary chat session may be held by the participant. The audio input device 220 may comprise a microphone while the video input device 224 may comprise cybercam. The audio input device 220 may be positioned in a location on the computing device 200 to allow speech to be easily transduced and transmitted into the network. The video input device 224 may be positioned to capture the participants participating during the audio/video conferencing session. The video input device 224 may provide an input to written material or presentation material that may be broadcasted to the other participants during the video/audio conference.

Call setup parameters may comprise the number of participants in a proposed conference call, the type of conference call, information on side conferences to be held simultaneously, date and time of conference call, meeting number, and user name or participant number. It is contemplated that one type of conference call comprises a pre-recorded conference call. This type of conference call may allow the audio or video to be enhanced prior to conference call playback. It is contemplated that the image and/or audio may be enhanced based on the quality of the original recording. Further, it is contemplated that a translation of the original pre-recorded audio into one or more languages may be facilitated by processing performed by the server.

One or more participants participating in a conference call may be displayed over one or more windows provided by a graphical user interface. Each participant may identified by way of a participant identifier. The participant identifier may comprise a software object that incorporates a participant's name, icon, logo, or other unique insignia in order to adequately identify the participant in a conference call. The participant identifiers may be arranged as a list of participants grouped together. As discussed later, the participant identifiers may be listed under a particular conference identifier, signifying the conference call they are participating in. It is contemplated that the participant identifiers may be listed in a roll call fashion, where participants are listed in the order they call in or log in to the audio/video conferencing system. Additional information concerning a participant may be obtained by way of using an exemplary mouse on the graphical user interface. It is contemplated that a listed participant may be pointed to and right clicked on (by the mouse) to reveal a participant's affiliation and contact information. A video feed on the participant may be generated by way of using the mouse. One or more video feeds may be presented over one or more windows provided by the graphical user interface. The size of the video feed may be adjusted to the participants needs by way of the graphical user interface.

A participant may be qualified as an authorized participant by way of additional screening and/or password verifications prior to login. Further, a participant's level of transmission security may be viewed. By listing the security levels of the participants' connections, it is possible to visualize the level of protection provided to the audio or video transmissions.

Current conference call configuration information may be provided by way of a window generated by a graphical user interface. The conference call configuration information may comprise the number of participants in a particular conference call, the status of a particular participant, and/or transmitted audio/video quality status. For example, a participant's status may include whether or not he has a question for one of the other participants. It is contemplated that other types of status information may also be provided by way of a particular window provided by the graphical user interface.

In one or more windows provided by the graphical user interface, one or more video feeds from one or more participants may be displayed. A particular video feed may be generated by way of double-clicking or selecting a participant using an exemplary mouse. The video compression ratio may be automatically selected based on transceived bandwidth of the participant's computing device. It is contemplated that multiple video feeds may be limited by the available bandwidth provided to the computing device. As a result, the audio/video conferencing device may limit the number of video feeds provided to a participant based on the available bandwidth.

Figure 3:
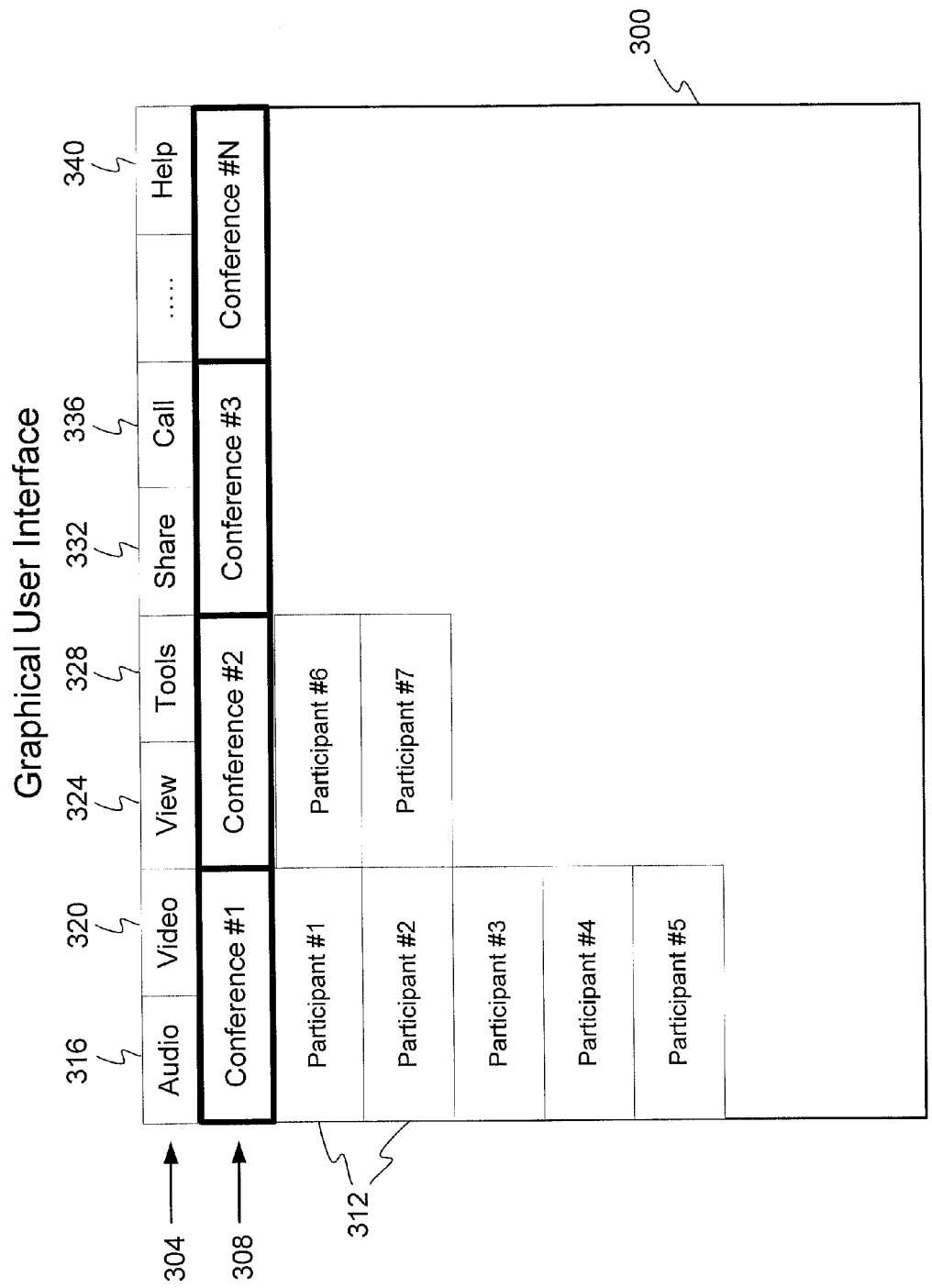
FIG. 3 illustrates a block diagram of a graphical user interface in accordance with an embodiment of the invention.

FIG. 3 illustrates a block diagram of a graphical user interface 300 in accordance with an embodiment of the invention. The graphical user interface 300 illustrates an exemplary window comprising a menu bar row 304, a conference identifiers row 308, and a number of participant identifiers 312. In this embodiment, participant #1 through participant #5 are grouped under conference identifier #1 while participant #6 and participant #7 are grouped under conference identifier #2. As shown, the participants associated with a particular conference call are grouped or positioned under the appropriate conference call identifier.

The menu bar row 304 may comprise a number of different pull down items of which a selection may be made. The menu bar row may comprise exemplary pull down menu selections such as a audio bar 316, video bar 320, view bar 324, tools bar 328, share bar 332, call bar 336, and a help bar 340. In one embodiment, the audio bar 316 may allow a participant to select an audio feed from one of several conference calls that he may participate in. For example, a participant may view two conference calls and their associated participants in one or more windows of a graphical user interface. However, the participant may select one of two audio feeds by selecting from the audio bar 316 pull down. Similarly, the video bar 320 may allow a participant to select one or more video feeds from any one or more conference calls that he may participate in. In one embodiment, a video feed of a particular participant may be generated by double-clicking or selecting an associated participant identifier. By doing so, a new window is generated by the graphical user interface containing the requested video feed. The view bar 324 may allow a participant to adjust the size of the workspace or window that appears in the graphical user interface. In one embodiment, the view bar 324 may allow the participant to select a particular percentage of zoom in or zoom out of one or more windows of a graphical user interface that he is using. The tools bar 328 may provide one or more selections that allow the participant, for example, to record a live audio or video conference to a data file. The share bar 332 may allow the participant to share a file, such as an exemplary application file, to participants of a conference call. The call bar 336 may, for example, allow the participant to mute his audio input device, disable his video input device, or configure one or more various other attendee privileges. The help bar 340 may, for example, allow the participant to request information regarding a particular pull down menu selection.

Referring to FIG. 4, it is contemplated that a side conference call may be configured by an authorized user, such as an administrator or host, by pointing, clicking, and dragging (using an exemplary mouse) a particular participant identifier over to a new conference call identifier, thereby creating a new conference call. For example, an administrator may point, click, and drag participants identifiers #3 and #5 of conference call #1 into the conference call #3 identifier. By doing so, participants #3 and #5 become participants of conference call #3. It is contemplated that the device that performs the pointing, clicking, and dragging of one or more objects within a graphical user interface comprises a mouse or like device. It is contemplated that, in one embodiment, requests made by prospective participants to generate a side conference call is agreed upon by the participants involved. It is contemplated that the server automatically generates a new conference call when all conditions are met for staging a new conference call. The conditions may comprise that a conference call be restricted certain participants or a number of participants. For example, the side conference may comprise members of a company or organization.

When there is more than one conference call available, the audio/video conferencing system may allow a participant to choose which conference call in which he would like to participate. Each conference call may be identified by way of a conference identifier. The conference identifier may comprise a software object that incorporates a conference call name. The conference identifier may comprise a software object that may incorporate a unique icon, logo, or other unique insignia. The graphical user interface may provide a default mode in which the first conference call identified by conference identifier #1 is provided as the audio and/or video feed. When the first conference call's audio feed is provided to the participant, the graphical user interface may highlight or color the conference identifier #1. In this fashion, the participant is visually notified as to the conference call in which he is listening and participating. It is contemplated that a user may select another conference call by way of using his exemplary mouse. For example, the appropriate conference call identifier may be selected by right clicking on the mouse to display one or more selection choices. An exemplary selection choice may be "select audio feed", which may be selected by left clicking on the mouse. If another conference call is selected, the associated conference identifier may be colored or highlighted appropriately.

It is further contemplated that security of a conference call may be adjusted by way of the graphical user interface. For example, a particular conference call identifier may have a number of selections regarding the security used when a participant participates in a particular conference call's transmission. It is contemplated that the level of security or security standard used may be determined by right clicking on the mouse and selecting an appropriate security level for the conference call selected.

As illustrated in the embodiment shown in FIG. 4, a conference call may be locked to prevent others from participating in the conference call. This may occur when a particular time has elapsed after the conference call has started. In other instances, the conference call may be locked when a certain number of participants have been reached. The criteria for locking the conference call may be determined by an administrator prior to scheduling an audio/video conference.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system comprising:
a computing device configured to interact with a video conference via a server, the video conference comprising a video feed, the computing device comprising processing circuitry configured to:
receive, via a user interface of the video conference, selection of a participant interacting with the video conference to associate the participant with a side video conference;
receive, responsive to the selection and authentication of the participant, a previously recorded portion of the video feed from the server for consumption by the participant in the side video conference, wherein the previously recorded portion of the video feed includes an aspect enhanced at the server; and
render the previously recorded portion of the video feed in a region of the user interface assigned to the side video conference.

2. The system of claim 1, wherein the processing circuitry is configured to authenticate the participant for the side video conference.

3. The system of claim 1, wherein the selection is made with a user action via the user interface, to select a participant identifier rendered in the user interface, wherein the participant identifier represents the participant interacting with the video conference.

4. The system of claim 3, wherein the user action comprises a point, click and drag action on an object of the at least one user interface corresponding to the participant identifier.

5. The system of claim 3, wherein the processing circuitry is configured to render a plurality of additional participant identifiers in the user interface.

6. The system of claim 5, wherein individual ones of the additional participant identifiers are associated with individual ones of a plurality of side video conferences.

7. The system of claim 1, wherein the participant operates a second computing device to interact with the video conference via the server.

8. The system of claim 1, wherein the computing device is operated by an administrator of the video conference.

9. A method comprising:
- receiving, in at least one computing device, a previously recorded portion of a video feed for a video conference, wherein the previously recorded portion of the video feed is received from at least one server;
- receiving, in the at least one computing device, a selection via a user interface of the video conference, of a participant interacting with the video conference to associate the participant with a side video conference; and
- rendering, responsive to the selection and authentication of the participant, the previously recorded portion of the video feed in a region of the user interface assigned to the side video conference for consumption by the participant, wherein the previously recorded portion of the video feed includes an aspect enhanced at the server.

10. The method of claim 9, further comprising receiving, in the at least one computing device, a request from the participant to be associated with the side video conference.

11. The method of claim 9, further comprising receiving, in the at least one computing device, an authentication of the participant for the side video conference.

12. The method of claim 9, wherein the at least one computing device is operated by an administrator for the video conference.

13. The method of claim 9, wherein the participant is associated with the side video conference responsive to a user selection via the user interface that associates a participant identifier of the participant with the region of the user interface assigned to the side video conference.

14. The method of claim 9, wherein the previously recorded portion of the video feed includes a language translation for the participant.

15. The method of claim 9 wherein the aspect of the previously recorded portion of the video feed that is enhanced by the server comprises at least one of an audio quality or an image quality.

16. A system, comprising:
- a computing device in communication with at least one server to interact with a video conference, the computing device configured to:
- receive a previously recorded portion of a video feed for the video conference, wherein the previously recorded portion of the video feed is received from a server;
- receive a selection of a participant interacting with the video conference, wherein the selection is via the user interface;
- indicate, responsive to the selection and authentication of the participant, that the participant is associated with the side video conference in the user interface; and
- render the previously recorded portion of the video feed in a region of the user interface assigned to the side video conference for consumption by the participant, wherein the previously recorded portion of the video feed includes an aspect enhanced at the server.

17. The system of claim 16, wherein the computing device is configured to authenticate the participant for the side video conference.

18. The system of claim 16, wherein the previously recorded portion of the video feed includes a language translation for the participant.

19. The system of claim 16, wherein the computing device is configured to indicate that the participant is associated with the side video conference by rendering a participant identifier of the participant within the side video conference region.

20. The system of claim 16, wherein the aspect of the previously recorded portion of the video feed that is enhanced comprises at least one of an audio quality or an image quality.

* * * * *